(12) United States Patent
Snodgrass

(10) Patent No.: US 7,532,719 B2
(45) Date of Patent: May 12, 2009

(54) VOICE ABSORBER FOR PORTABLE TELEPHONIC DEVICES

(76) Inventor: Robert M Snodgrass, 18633 Cambridge, Spring Lake, MI (US) 49456

( * ) Notice: Subject to any disclaimer, the term of this patent is extended or adjusted under 35 U.S.C. 154(b) by 722 days.

(21) Appl. No.: 11/085,937

(22) Filed: Mar. 22, 2005

(65) Prior Publication Data
US 2006/0215835 A1    Sep. 28, 2006

(51) Int. Cl.
H04M 1/00 (2006.01)
H04M 9/00 (2006.01)

(52) U.S. Cl. .................. 379/441; 379/444; 379/447; 455/575.6

(58) Field of Classification Search ......... 379/441–444, 379/447; 381/87, 333, 353, 354, 359; 455/575.1, 455/575.6, 90.3
See application file for complete search history.

(56) References Cited
U.S. PATENT DOCUMENTS
4,449,236 A * 5/1984 Walker, Jr. ............. 381/91
* cited by examiner Primary Examiner—Curtis Kuntz
Assistant Examiner—Tuan D Nguyen
(74) Attorney, Agent, or Firm—Van Dyke, Gardner, Linn & Burkhart, LLP

(57) ABSTRACT

The voice absorber of the present invention includes an absorption member and an attachment member and is adapted for use with portable telephonic devices to enable a user to engage in a more private conversation and limit the disruption to individuals nearby the user during the conversation. The absorption member is formable into a conical shape and may be constructed of multiple layers, including a layer specifically adapted to absorb sound waves. The attachment member enables the voice absorber to be easily affixed and removed from portable telephonic devices and generally positions the absorption member in front of the user's mouth. The voice absorber also functions to isolate the transmitter portion of a portable telephonic device from ambient, background noise and serves as a reminder to a user to speak with a quieter voice. The voice absorber may include words, symbols, drawings, or be colored to provide marketing exposure.

22 Claims, 6 Drawing Sheets

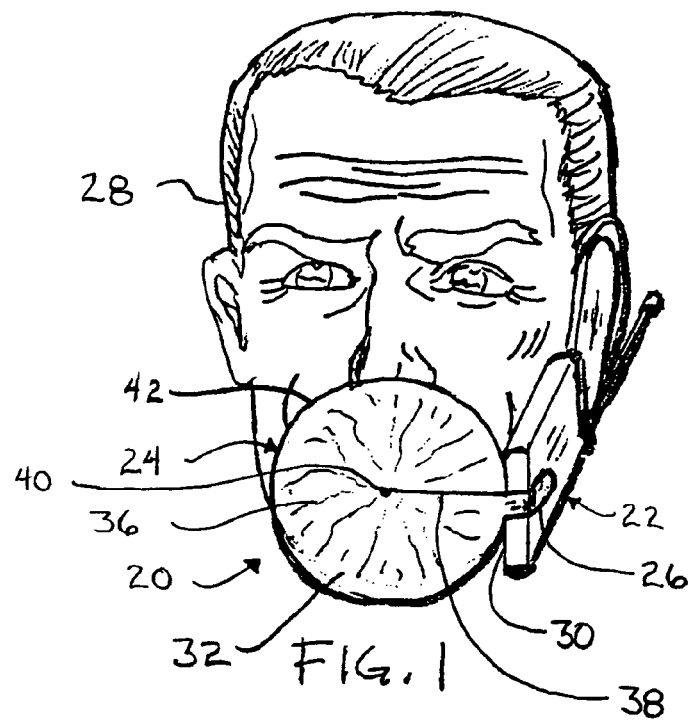
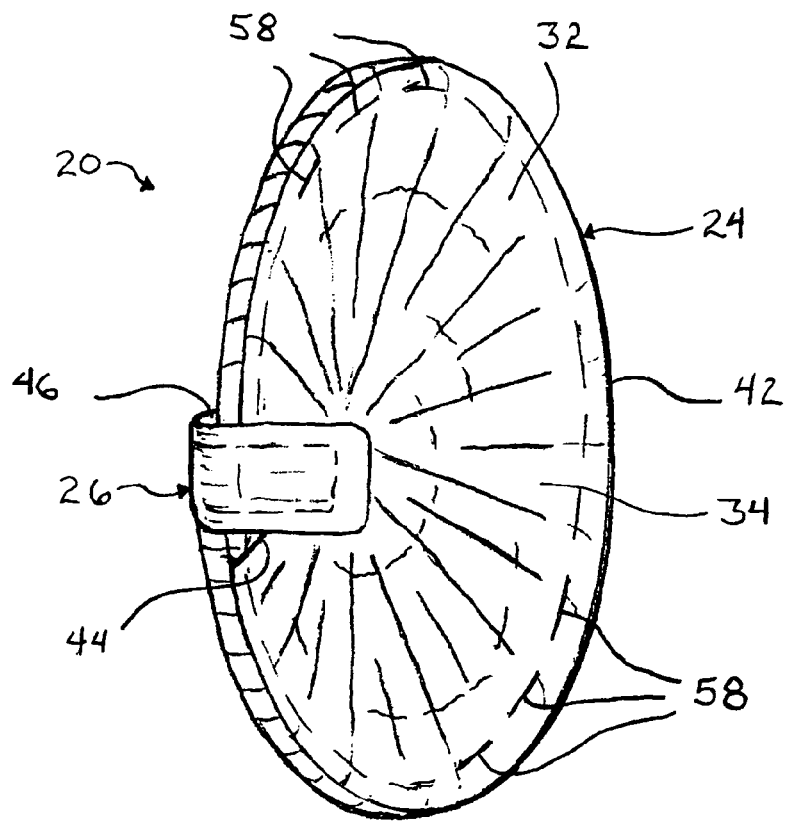

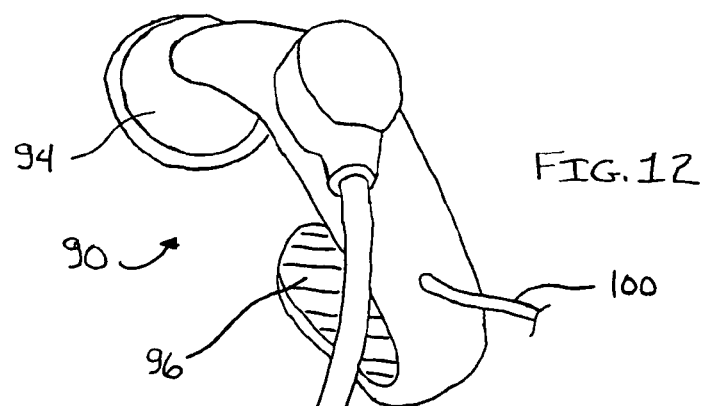
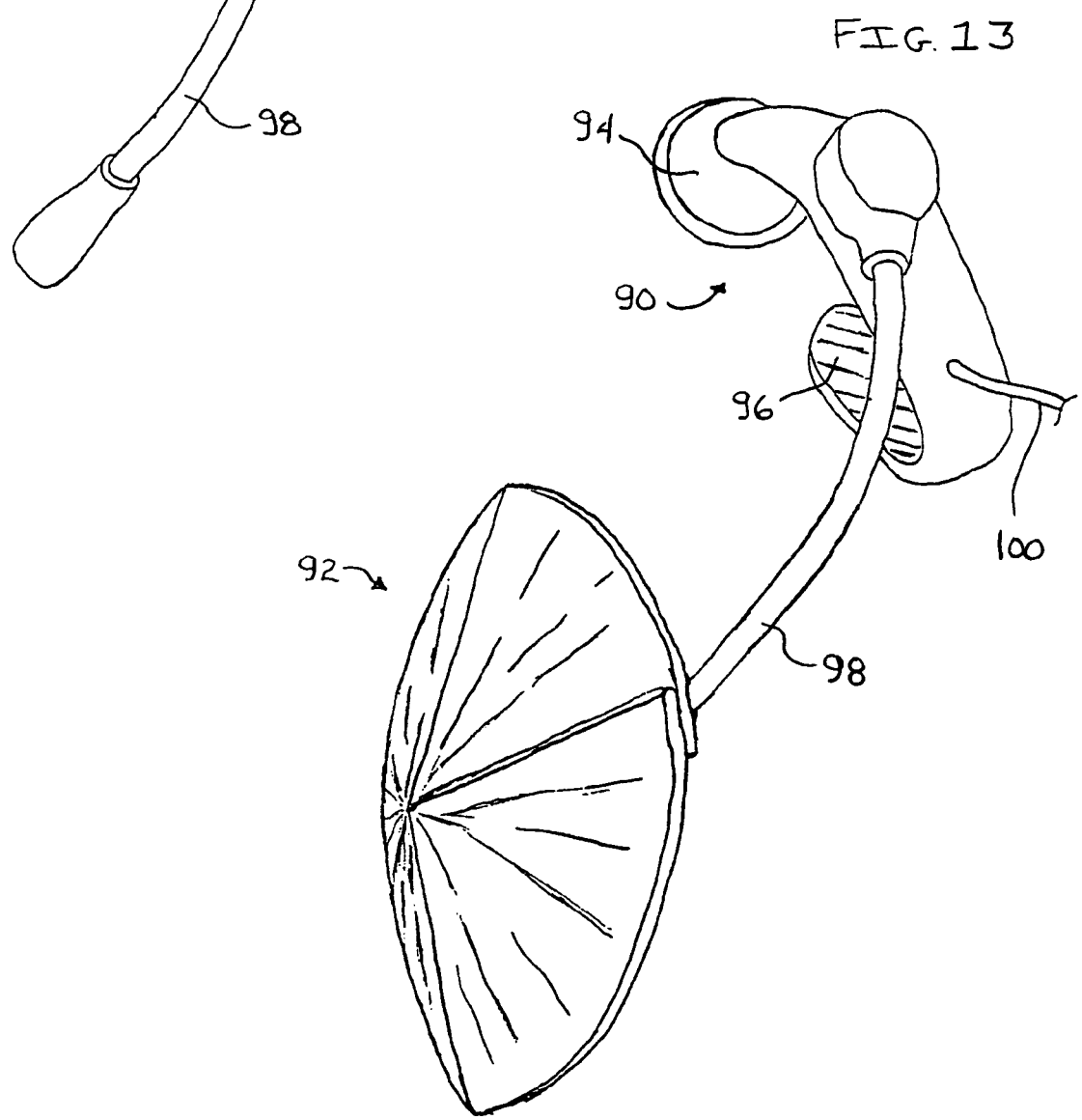

VOICE ABSORBER FOR PORTABLE TELEPHONIC DEVICES

BACKGROUND AND TECHNICAL FIELD OF THE INVENTION

The present invention is directed to a vocal sound wave absorber, and in particular to a voice absorber for portable telephonic devices to absorb and/or attenuate sound waves generated during a conversation by a user of such a telephonic device in order to increase the privacy of the conversation and to limit the disruption to others located in the vicinity of the user during the conversation.

Portable telephonic devices, such as cellular phones and headsets, are becoming increasingly more prevalent as they provide an effective means of exchanging information and remaining in contact when a user is away from a traditional telephone. Advances in technology and reductions in cost have combined to spur the usage of such portable telephonic devices.

Portable telephonic devices are frequently used by individuals in places that are open to the public. For example, they are used on sidewalks and in stores, and while traveling on public modes of transportation, such as trains, busses, and the like. Two difficulties that exist with the use of portable telephonic devices in public areas is that it is difficult for a user to keep the conversation private due to the presence of others and his or her conversation may create a distraction to those individuals located in the vicinity of the conversation.

These difficulties create a dilemma for conscientious portable telephonic device users. In order to keep the conversation private and not disturb others, the user may try and speak softly; however, this may make it difficult for the person to whom he or she is speaking to hear what the user is saying. If the portable telephonic device user speaks with a louder voice to ensure that the person to whom he or she is speaking will hear what is said, the conversation will become less private and more disruptive to others.

Therefore, there is a need for a device that assists a portable telephonic device user to both keep his or her conversation private and prevents disturbances to individuals nearby the user, but which does not detract from the convenience and ease of use of portable telephonic devices.

SUMMARY

According to an aspect of the present invention, a voice absorber for use with portable telephonic devices to absorb sound waves generated by the user of the portable telephonic device comprises an absorption member and an attachment member, the attachment member adapted to being selectively attachable to the portable telephonic device such that the absorption member is positioned proximate the mouth of the user.

According to another aspect of the present invention, a voice absorber for use with the headset portion of a hands-free portable telephonic device to absorb sound waves generated by the user of the headset comprises an absorption member, the absorption member adapted to being selectively attachable to the headset such that the absorption member is positioned proximate the mouth of the user.

According to yet another aspect of the present invention, a voice attenuator for use with portable telephonic devices to absorb and attenuate sound waves generated by the user of the portable telephonic device comprises an absorption member and a noise canceling device, the noise canceling device including a processor adapted to receive an input signal indicative of sound waves generated by the user of the portable telephonic device and being operable to generate an output signal in response to the input signal, the output signal attenuating the sound waves generated by the user.

The voice absorber of the present invention includes an absorption member and an attachment member and is well adapted to both enable a user to engage in a more private conversation when using portable telephonic devices and simultaneously limit the disruption to individuals nearby the user during the conversation. The absorption member includes a slit such that it is formable into a conical shape to generally form around a user's mouth. The absorption member may be constructed of multiple layers, including a layer specifically adapted to absorb sound waves. When positioned in front of a user's mouth, a portion of the sound waves generated by the user during a conversation are absorbed by the voice absorber such that the conversation is conducted with increased privacy and reduced distraction to others. The attachment member enables the voice absorber to be easily affixed and removed from portable telephonic devices and, when attached, generally positions the absorption member in front of the user's mouth. The voice absorber additionally functions to isolate the transmitter portion of a portable telephonic device from ambient, background noise, thus allowing a user to speak at lower volumes while still enabling the party to whom he or she is speaking to hear what is said by the user. An active noise canceling device may be included on the voice absorber to further attenuate the sound waves generated by a user during a conversation. The voice absorber also serves as a reminder to a user to speak with a quieter voice to keep his or her conversation private and to be considerate of those nearby. The voice absorber may also include words, symbols, drawings, or be colored to provide marketing exposure.

BRIEF DESCRIPTION OF THE DRAWINGS

FIG. 1 is an illustrative view of a preferred embodiment of a voice absorber of the present invention affixed to a cellular phone being used by a user;

FIG. 2 is a rear perspective view of the cellular phone voice absorber of FIG. 1;

FIG. 12 is a headset style portable telephonic device that may be used with the present invention;

FIG. 13 is a perspective view of another preferred embodiment of the voice absorber of the present invention affixed to the headset of FIG. 12;

DESCRIPTION OF THE PREFERRED EMBODIMENT

Figure 3:
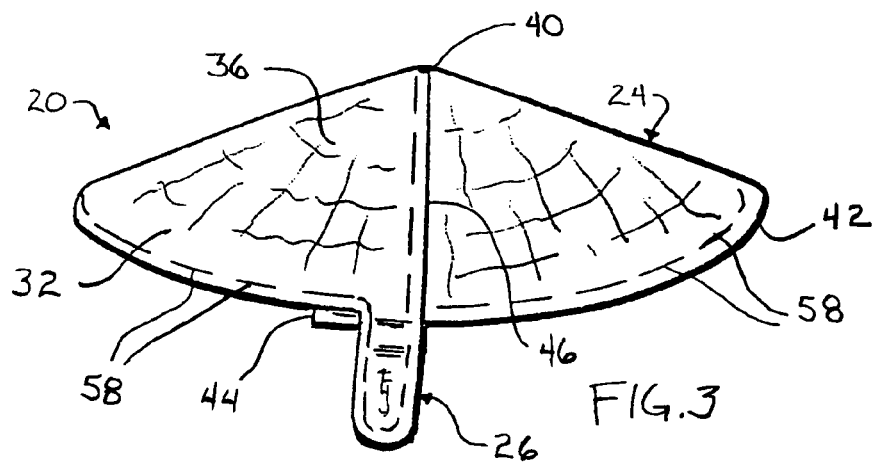
FIG. 3 is a side perspective view of the voice absorber of FIG. 2.

The present invention is embodied in a cellular phone voice absorber. In particular, the preferred embodiment of the present invention is intended to be used with portable telephonic devices to absorb and/or attenuate sound waves generated during a conversation by a user of such a telephonic device in order to both increase the privacy of the conversation and to limit the disruption to others located in the vicinity of the user during the conversation.

A preferred embodiment of the present invention is shown in the drawings as a voice attenuator or voice absorber 20. Voice absorber 20, as shown in FIG. 1, is intended to be secured to portable telephonic devices, such as cellular phone 22, and includes an absorption member 24 and an attachment member 26. Attachment member 26 enables voice absorber 20 to be selectively and removably attached to cellular phone 22 such that absorption member 24 is generally positioned in front of the mouth of the user 28 of the cellular phone. When voice absorber 20 is so attached to cellular phone 22 and a user 28 engages in a conversation using the phone 22, a portion of the sound waves generated by user 28 during the conversation are absorbed by absorption member 24, thus enabling the conversation to be conducted with increased privacy. The utilization of voice absorber 20 during such a conversation is also courteous to individuals positioned nearby the user 28 of cellular phone 22 as the disruption to those individuals due to the conversation is reduced. In addition, voice absorber 20 functions to isolate the transmitter portion 30 of cellular phone 22 from ambient, background noise, thereby allowing user 28 to speak at lower volumes while still enabling the person to whom he or she is talking to hear what is said by the user 28. Furthermore, use of voice absorber 20 serves as a reminder to user 28 to speak with a quieter voice to keep his or her conversation private and to be considerate of those nearby.

In the preferred embodiment, as noted above and shown in FIGS. 2, 3, and 5-7, voice absorber 20 includes an absorption member 24 and an attachment member 26. Absorption member 24 is constructed as a generally circular pad 32 having a substantially disk shaped form and includes opposing first and second surfaces 34, 36. Pad 32 includes a generally radial slit 38 between first and second surfaces 34, 36 that extends from approximately the center 40 of pad 32 to its outer, circumferential edge 42 such that pad 32 includes first and second edges 44, 46 located on either side of slit 38. As shown in FIGS. 2 and 3, slit 38 enables pad 32 to be selectively shaped to have a generally conical form by overlapping first and second edges 44, 46 whereby a portion of first surface 34 overlaps and contacts a portion of second surface 36.

Figure 5:
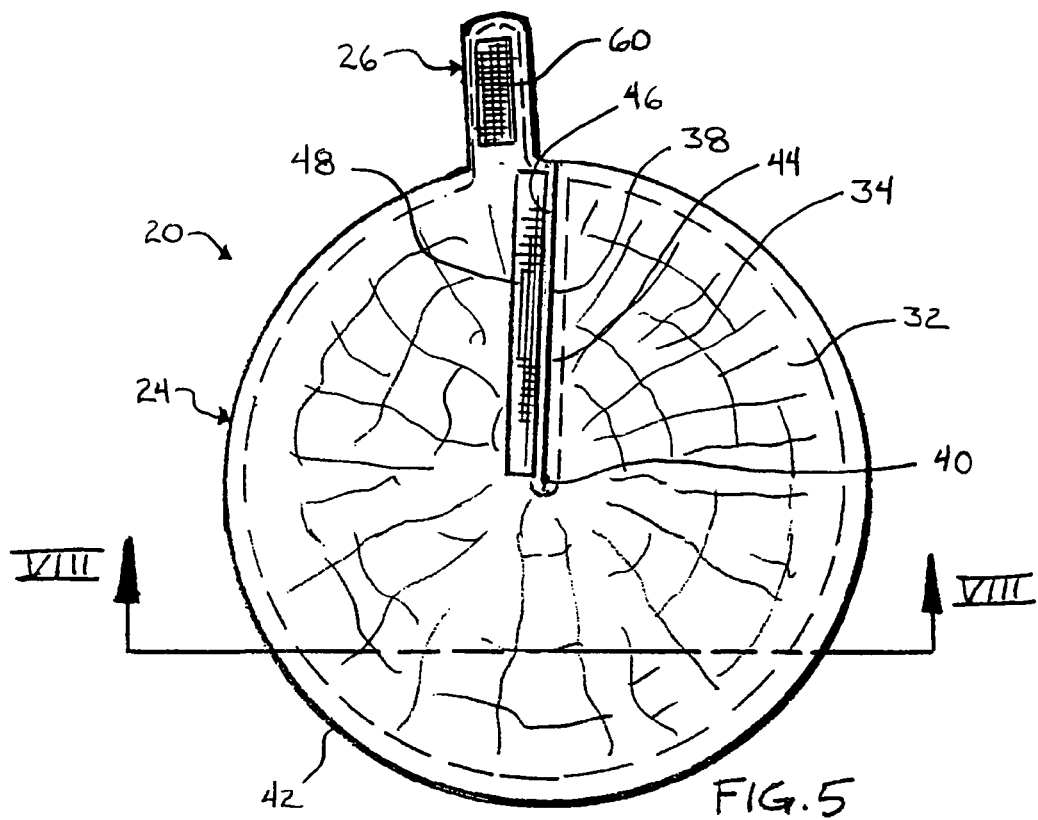
FIG. 5 is a bottom elevation view of a preferred embodiment of the voice absorber of the present invention disclosed in a flat orientation.
Figure 6:
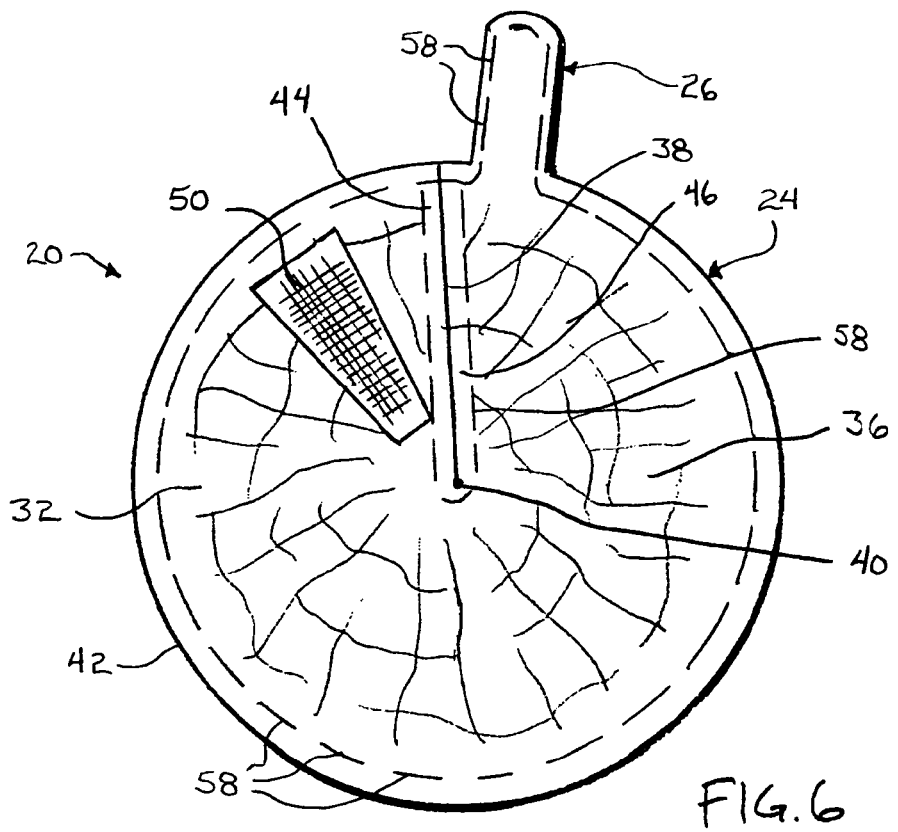
FIG. 6 is a top elevation view of the voice absorber of FIG. 5.

As shown in FIG. 5, a first securing member 48 is attached to first surface 34 adjacent slit 38 and, as shown in FIG. 6, a second securing member 50 is attached to second surface 36. First and second securing members 48, 50, in the preferred embodiment shown, are constructed of Velcro material such that pad 32 is able to be selectively retained in the generally conical position shown in FIGS. 2 and 3 when first and second edges 44, 46 are overlapped in the above noted manner. It should be understood, however, that alternative securing members 48, 50 and methods may be utilized to selectively retain pad 32 in a conical position. For example, second surface 36 could be constructed of a cloth material adapted to receive the Velcro material of first securing member 48 such that pad 32 may be formed into cones of various slopes. Furthermore, first and second securing members 48, 50 may also be constructed as alternative types of fasteners, such as snaps, buttons, clips, or the like, and still function to selectively and removably overlap first and second surfaces 34, 36 as shown in FIGS. 2 and 3.

The ability to selectively adjust voice absorber 20 from a flat disk shape to a conical shape makes it convenient for transport. For example, when first and second edges 44, 46 are not overlapped, as shown in FIGS. 5 and 6, voice absorber 20 appears as a flat disk that may be easily carried in a pocket, purse, or other type of carrying case. However, it should also be appreciated that voice absorber 20 may be constructed without slit 38 such that it is not selectively formable into a particular orientation. In this alternative, voice absorber 20 may be permanently formed as a flat disk, or may be constructed to permanently have a cone, bowl, or other geometric type form.

Figure 8:
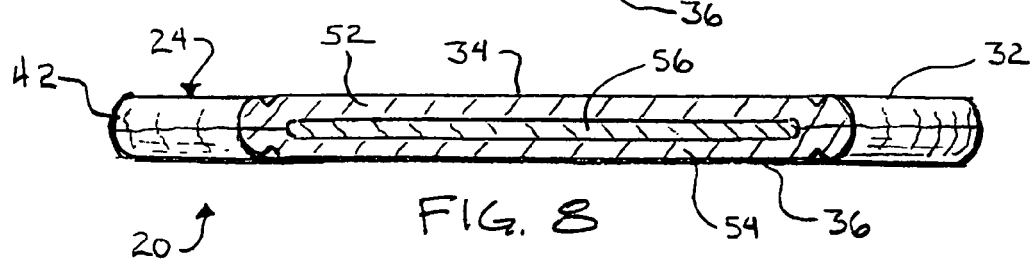
FIG. 8 is an enlarged cross-sectional view along the line VIII-VIII of FIG. 5.

FIG. 8 discloses that, in the preferred embodiment, pad 32 is constructed of a first layer 52, which forms first surface 34, a second layer 54, which forms second surface 36, and an inner layer 56. First and second layers 52, 54 are secured together by stitching 58 and inner layer 56 is constrained between first and second layers 52, 54. Inner layer 56 is preferably constructed of a sound absorption material, such as a foam or a cloth type batting material. First layer 52, which may contact portions of a user's face, is preferably constructed of a comfortable material such as neoprene or soft cloth, and second layer 54 may be constructed of vinyl, leather, neoprene or other type material. It should be appreciated that alternative materials may be used for first, second, and inner layers 52, 54, 56 and that first and second layers 52, 54 may be secured together by alternative methods, such as adhesives, while still allowing voice absorber 20 to function as intended. Furthermore, it should also be appreciated that voice absorber 20 may be constructed of more or fewer layers as compared to that disclosed in FIG. 8.

Figure 4:
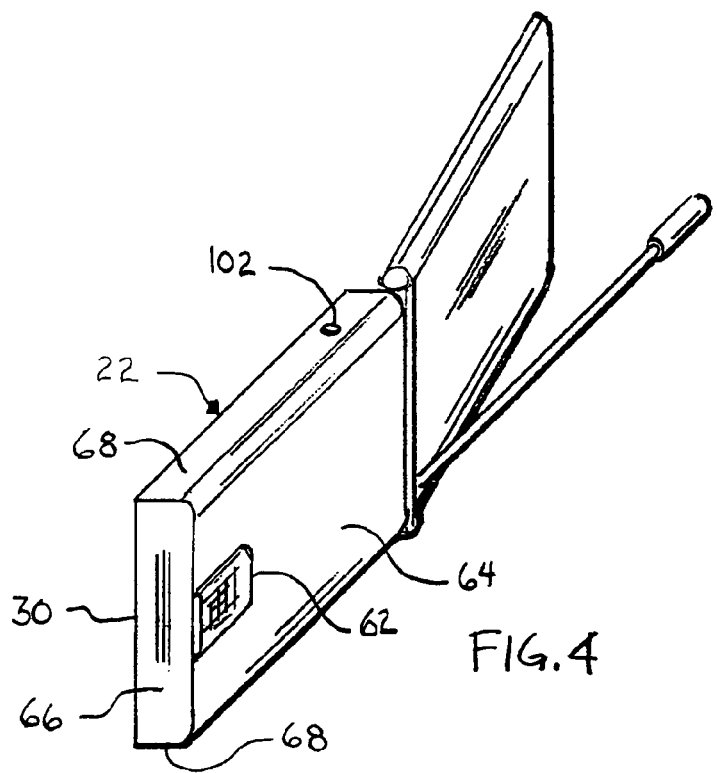
FIG. 4 is a cellular phone style portable telephonic device adapted for use with the voice absorber of the present invention.
Figure 7:
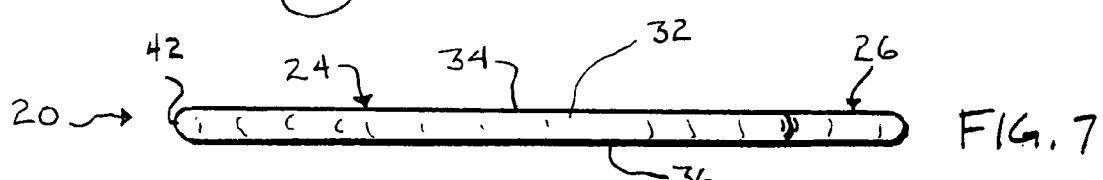
FIG. 7 is a side elevation view of the voice absorber of FIG. 5.

As shown throughout the various views, attachment member 26 extends from circumferential edge 42 of pad 32 in a generally radial orientation away from pad 32. FIG. 5 discloses a securing member 60 affixed to attachment member 26 where, in the preferred embodiment shown, securing member 60 is constructed of a Velcro material. As shown in FIG. 4, cellular phone 22 includes a securing tab 62 secured to a back surface 64 of phone 22 that is also constructed of a corresponding Velcro material adapted to selectively and removably receive securing member 60 of attachment member 26.

Securing tab 62 may be mounted to cellular phone 22 using either a permanent adhesive or a releasable adhesive, where the adhesive is exposed by removal of a covering strip (not shown) in a known manner prior to installation. Securing tab 62 may alternatively be mounted to the lower surface 66 or side surfaces 68 of the phone 22. Furthermore, securing tab 62 could even be located on a case or cover (not shown) used to protect the cellular telephone 22. Securing member 60 and securing tab 62 could also be constructed as alternative types of fasteners, such as snaps, buttons, clips, or the like, and still function to selectively and removably secure voice absorber 20 to cellular phone 22. Still further, another alternative would be to form securing member 60 as an adhesive patch (not shown) that could be directly secured to cellular phone 22 without the need for securing tab 62. In such an embodiment, the adhesive patch could be covered by a removable film that would be peeled off prior to affixing voice absorber 20 to cellular phone 22.

Figure 9:
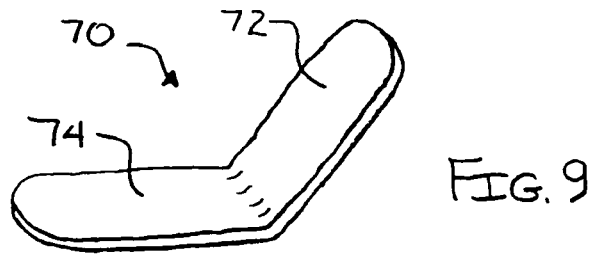
FIG. 9 is a perspective view of a support member that may be used with another preferred embodiment of a voice absorber of the present invention.
Figure 10:
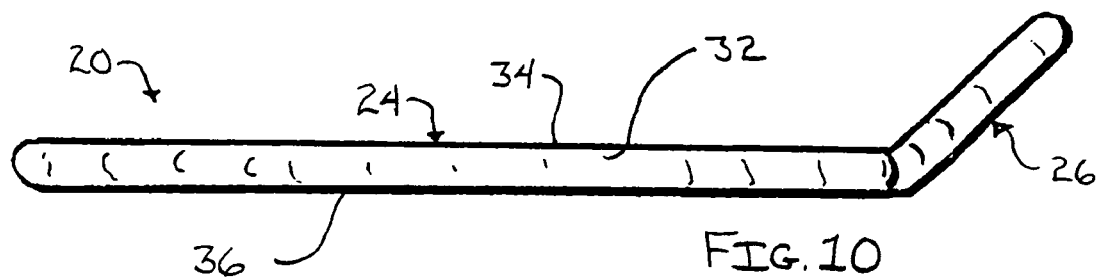
FIG. 10 is a side elevation view of the voice absorber of FIG. 5 shown with the support member of FIG. 9 contained therein.

FIG. 9 discloses a generally L-shaped support member having first and second legs 72, 74 that may be used with voice absorber 20 to provide added support when affixed to cellular phone 22. Support member 70 is adapted to be installed within voice absorber 20 such that first leg 72 is located within attachment member 26 and second leg 74 extends within pad 32. When support member 70 is so installed, as shown in FIG. 10, the angled orientation of attachment member 26 to absorption member 24 is more rigidly maintained. Support member 70 may be permanently contained within voice absorber 20, such as by being sewn or glued in place or, alternatively, support member 70 may be selectively inserted into a pocket or sleeve (not shown) on voice absorber 20.

Figure 11:
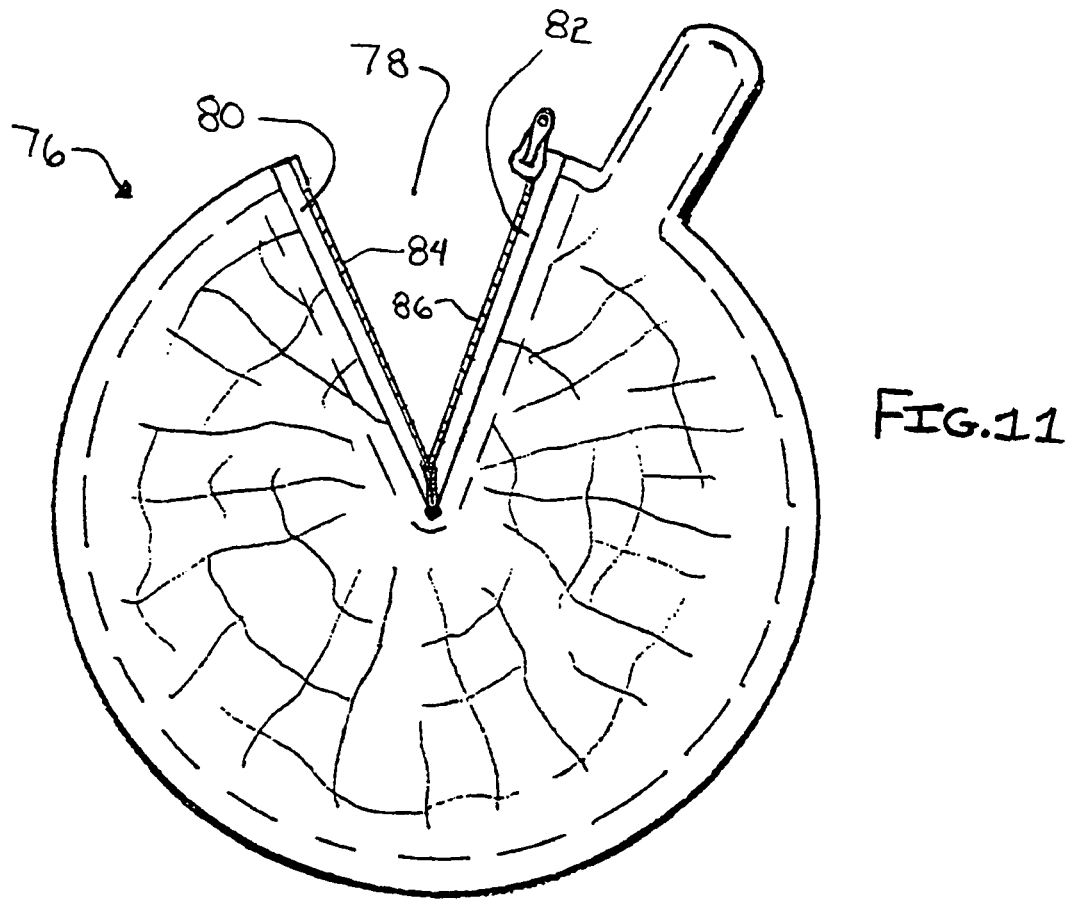
FIG. 11 is yet another preferred embodiment of the voice absorber of the present invention.

FIG. 11 discloses an alternative voice absorber 76 that is of similar construction and function to voice absorber 20 described above. Voice absorber 76 includes a pie or wedge shaped opening 78 bounded by first and second edges 80, 82. First and second zipper halves 84, 86 are affixed to first and second edges 80, 82 such that first and second edges 80, 82 may be joined together to form pad 88 into a conical orientation. Alternatively, first and second edges 80, 82 may be selectively secured together using Velcro, hooks, clasps, or other types of detachable fasteners.

FIG. 12 discloses a hands-free headset 90 type portable telephonic device that is well adapted for use with alternative voice absorber 92, as shown in FIG. 13, where voice absorber 92 is also of similar construction and function to voice absorber 20. Headset 90 includes an ear piece 94 adapted to fit within a user's ear, an ear clip 96 adapted to fit behind a user's earlobe, and a microphone arm 98 that is adapted for positioning in front of a user's mouth. Headset 90 is shown to include cord 100 that is adapted to be connected to a jack 102 (FIG. 4) of a standard cellular phone 22. It should be appreciated, however, that headset 90 may employ wireless technology, such as BLUETOOTH® or ZIGBEE®, whereby cord 100 is not required. As shown in FIG. 13, voice absorber 92 is secured to microphone arm 98. Although not shown, voice absorber 92 may be secured to microphone arm 98 by being inserted through loops, enclosed by a Velcro flap, secured by clips, or the like.

Figure 14:
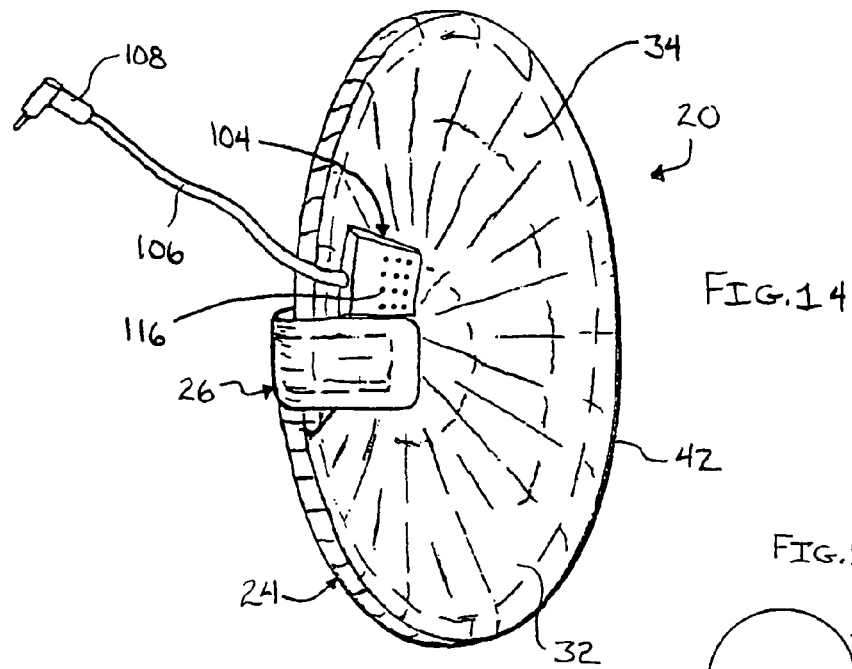
FIG. 14 is a perspective view of the voice absorber of FIG. 2 shown with an active noise canceling device affixed thereto.

To further prevent the sound waves generated by a user 28 from being heard by others, an active noise canceling device 104 may be included on voice attenuator or voice absorber 20, as shown in FIG. 14. Active noise cancellation apparatuses are known and generally disclosed, for example, in U.S. Pat. No. 4,953,217 issued to Twiney et al., U.S. Pat. No. 6,654,467 issued to York et al., and U.S. Pat. No. 6,647,118 issued to Miura et al. Noise canceling device 104 may be adapted to emit a signal having an approximately inverse phase and equal amplitude relationship to the sound waves generated by the user 28, thereby having the effect of reducing or canceling the amount of user 28 generated sound waves traversing beyond voice absorber 20. Alternatively, noise canceling device 104 may output a phase shifted signal proportional to the sound waves generated by the user 28. As shown in FIG. 14, noise canceling device 104 is mounted to first surface 34 and may be removably affixed using Velcro, buttons, snaps, or the like. Alternatively, noise canceling device 104 may be permanently secured by being sewn in place, affixed by an adhesive, or the like. Although shown affixed to first surface 34, it should be understood that noise canceling device 104 may alternatively be secured to second surface 36.

Figure 15:
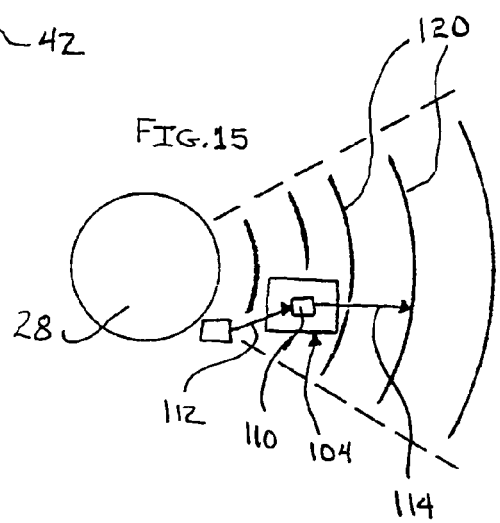
FIG. 15 is a schematic illustration of the operation of the active noise canceling device of FIG. 14.

Noise canceling device 104 may include an electrical signal cord 106 and plug 108, with plug 108 being adapted for insertion into jack 102 of cellular telephone 22. In this embodiment, as shown in FIG. 15, noise canceling device 104 may be powered by and receive an input signal 112 from cellular telephone 22, with the received input signal 112 being indicative of the sound waves 120 generated by the user 28 while speaking. Noise canceling device 104, therefore, need not include sound detection components, such as microphones. A processor 110 within noise canceling device 104 is operable to process the input signal 112 received from the cellular telephone 22 and generate an output signal 114 to attenuate the amount of user 28 generated sound waves 120 traversing beyond voice absorber 20. Alternatively, noise canceling device 104 may be battery powered and include sound detection components 116 such that it is self contained. In such an alternative configuration, the sound detection components 116 are adapted to provide an input signal 112 to processor 110.

Figure 16:
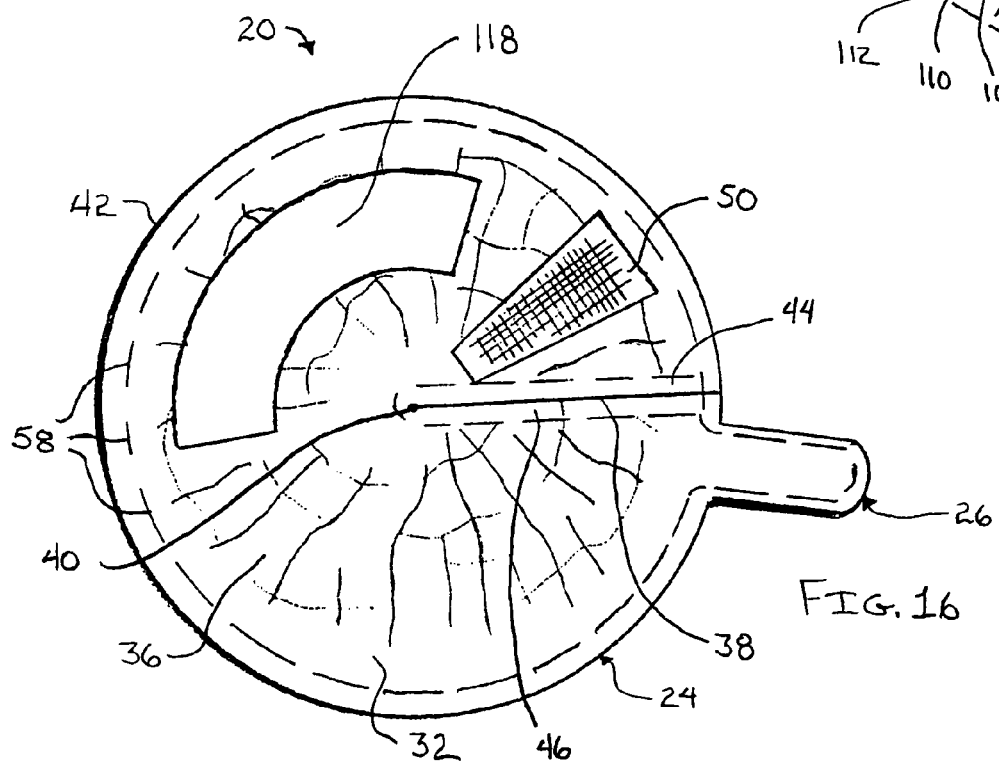
FIG. 16 is a top elevational view of the voice absorber of FIG. 5 shown to include an area for displayable information.

As shown in FIG. 16, an area or patch 118 on second surface 36 of voice absorber 20 may include words, symbols, drawings, or be colored to convey information, such as business information or general expressive markings. In regard to business information, a business entity, such as an airline, may distribute voice absorbers 20 with second surface 36 displaying the trade name, trademark, or other such logo of the distributing entity, thus providing marketing exposure. Although FIG. 15 discloses that area 118 only covers a portion of second surface 36, it should be understood that the entire second surface 36 may be colored or printed with such communicative markings.

Voice absorbers 20, 76, 92 are well adapted to enable a user to engage in a more private conversation when using portable telephonic devices while simultaneously limiting any disruption to individuals nearby the user during the conversation. The absorption member 24 of voice absorber 20 includes a slit 38 such that it is formable into a conical shape to thereby generally form around a user's mouth. In a preferred embodiment, the absorption member 24 is constructed of multiple layers 52, 54, 56 and includes a layer 56 specifically adapted to absorb sound waves. When positioned in front of a user's mouth, a portion of the sound waves generated by the user 28 during the conversation are absorbed by voice absorber such that the conversation is conducted with increased privacy and reduced distraction to others. The attachment member 26 enables voice absorber 20 to be easily affixed and removed from portable telephonic devices and, when attached, generally positions absorption member 24 in front of the mouth of the user 28. Voice absorber 20 additionally functions to isolate the transmitter portion 30 of a portable telephonic device from ambient, background noise, thus allowing a user 28 to speak at lower volumes while still enabling the party to whom he or she is speaking to hear what is said by the user 28. Noise canceling device 104 may be included on a first surface 34 of voice absorber 20 to further attenuate sound waves 120 generated by user 28 during a conversation. Voice absorber 20 also serves as a reminder to a user 28 to speak with a quieter voice to keep his or her conversation private and to be considerate of those nearby. Furthermore, second surface 36 of voice absorber 20 may include words, symbols, drawings, or be colored to provide marketing exposure.

The above is a description of the preferred embodiments. One skilled in the art will recognize that changes and modifications may be made without departing from the spirit of the The embodiments of the invention in which I claim an exclusive property right or privilege are defined as follows:

1. A voice absorber for use with portable telephonic devices to absorb sound waves generated by the user of the portable telephonic device, said voice absorber comprising:
   an absorption member; and
   an attachment member;
said attachment member adapted to being selectively attachable to the portable telephonic device such that said absorption member is positioned proximate the mouth of the user, wherein said absorption member is a substantially disk shaped pad, and wherein said pad includes a generally radial extending slit, said slit adapted to enable said pad to be selectively shaped to have a generally conical form.

2. The voice absorber of claim 1, wherein said pad includes first and second surfaces, and wherein said first surface includes a securing member, said securing member being adapted to selectively retain said pad in a generally conical form.

3. The voice absorber of claim 2, wherein said securing member is constructed of a Velcro material and is located proximate said slit, and wherein said second surface is adapted to selectively receive said securing member.

4. The voice absorber of claim 1, wherein said pad has a wedge shaped opening with first and second edges, wherein said first and second edges are adapted to be selectively secured together such that said pad has a generally conical form.

5. The voice absorber of claim 4, further including a zipper, wherein said zipper is adapted to selectively secure said first and second edges together.

6. The voice absorber of claim 1, wherein said attachment member includes a securing member, said securing member being adapted to selectively attach said voice absorber to a portable telephonic device.

7. The voice absorber of claim 6, wherein said securing member is constructed of a Velcro material.

8. The voice absorber of claim 1, further including a support member, said support member being securable within said voice absorber at said attachment member and adapted to maintain a desired orientation of said attachment member relative to said absorption member.

9. The voice absorber of claim 1, wherein said absorption member is constructed of at least two layers, and wherein one of said layers is a sound absorption material.

10. The voice absorber of claim 1, wherein said absorption member includes first and second surfaces, and wherein said second surface includes displayable information consisting of at least one of the group selected from words, symbols, and drawings.

11. The voice absorber of claim 1, further including a noise canceling device, wherein said noise canceling device includes a processor adapted to receive an input signal indicative of the sound waves generated by the user of the portable telephonic device and being operable to generate an output signal in response to said input signal, said output signal attenuating the sound waves generated by the user.

12. A voice absorber for use with the headset portion of a hands-free portable telephonic device to absorb sound waves generated by the user of the headset, said voice absorber comprising an absorption member, said absorption member adapted to being selectively attachable to the headset such that said absorption member is positioned proximate the mouth of the user, wherein said absorption member is a substantially disk shaped pad, and wherein said pad includes a generally radial extending slit, said slit being adapted to enable said pad to be selectively shaped to have a generally conical form.

13. The voice absorber of claim 12, wherein said pad includes first and second surfaces, and wherein said first surface includes a securing member, said securing member being adapted to selectively retain said pad in a generally conical form.

14. The voice absorber of claim 13, wherein said securing member is constructed of a Velcro material and is located proximate said slit, and wherein said second surface is adapted to selectively receive said securing member.

15. The voice absorber of claim 12, wherein said absorption member is constructed of at least two layers, and wherein one of said layers is a sound absorption material.

16. The voice absorber of claim 12, wherein said absorption member includes first and second surfaces, and wherein said second surface includes displayable information consisting of at least one of the group selected from words, symbols, and drawings.

17. The voice absorber of claim 12, further including a noise canceling device, wherein said noise canceling device includes a processor adapted to receive an input signal indicative of the sound waves generated by the user of the portable telephonic device and being operable to generate an output signal in response to said input signal, said output signal attenuating the sound waves generated by the user.

18. A voice absorber for use with port able telephonic devices to absorb sound waves generated by the user of the port able telephonic device, said voice absorber comprising:
an absorption member, said absorption member being adapted to passively absorb sound waves generated by a user;
an attachment member, said attachment member being integrated to said absorption member; said attachment member adapted to being selectively attachable to an exterior surface of a portable telephonic device such that said absorption member is positioned proximate the mouth of the user; wherein said absorption member is a substantially disk shaped pad that is selectively formable to have a generally conical form and wherein said pad includes a generally radial extending slit, said slit adapted to enable said pad to be selectively shaped to have a generally conical form.

19. The voice absorber of claim 18, wherein said pad includes first and second surfaces, and wherein said first surface includes a securing member, said securing member being adapted to selectively retain said pad in a generally conical form.

20. The voice absorber of claim 19, wherein said securing member is constructed of a Velcro material and is located proximate said slit, and wherein said second surface is adapted to selectively receive said securing member.

21. The voice absorber of claim 18, wherein said pad has a wedge shaped opening with first and second edges, wherein said first and second edges are adapted to be selectively secured together such that said pad has a generally conical form.

22. The voice absorber of claim 21, further including a zipper, wherein said zipper is adapted to selectively secure said first and second edges together.

* * * * *